G. L. HUNTRESS, Jr.
WATER GAGE.
APPLICATION FILED DEC. 22, 1910.
1,059,733.
Patented Apr. 22, 1913.
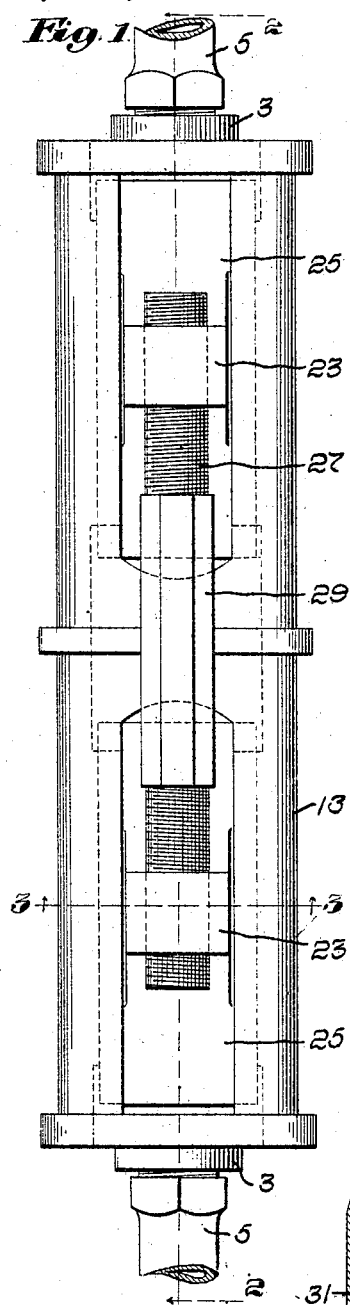
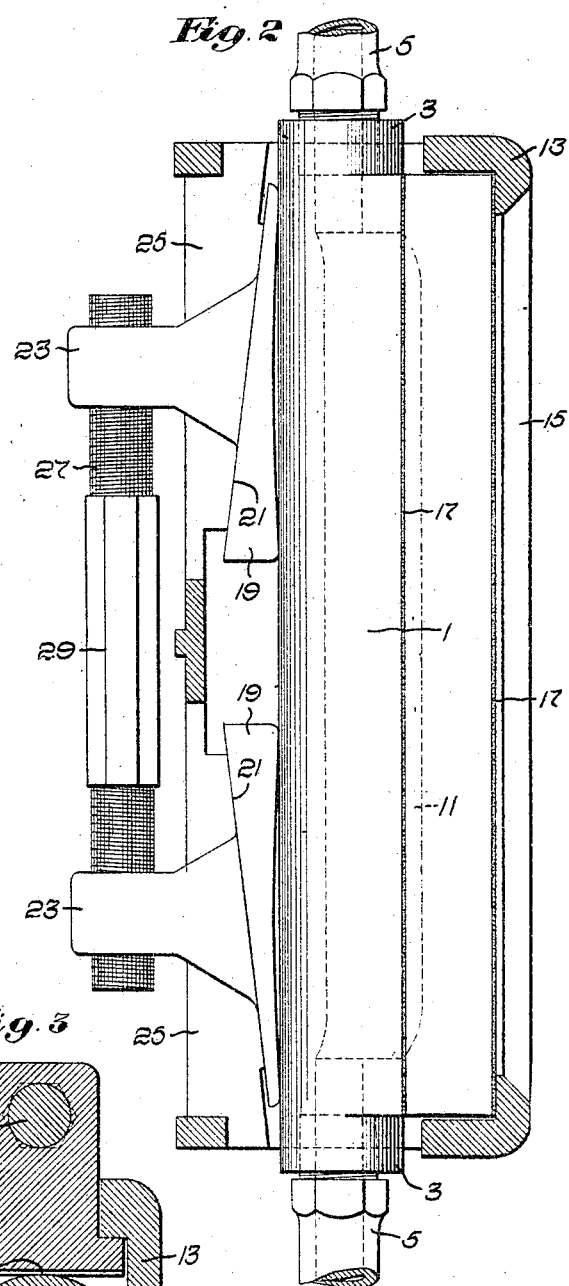
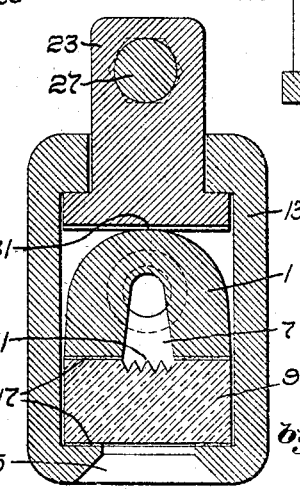
Witnesses:
Horace H. Crossman
Robert H. Kammler
Inventor:
George L. Huntress, Jr.
by Emery, Booth, Janney & Varney
Attys

UNITED STATES PATENT OFFICE.

GEORGE L. HUNTRESS, JR., OF WINCHESTER, MASSACHUSETTS.

WATER-GAGE.

1,059,733.

Specification of Letters Patent. Patented Apr. 22, 1913.

Application filed December 22, 1910. Serial No. 598,789.

*To all whom it may concern:*

Be it known that I, GEORGE L. HUNTRESS, Jr., a citizen of the United States, and a resident of Winchester, in the county of Middlesex and State of Massachusetts, have invented an Improvement in Water-Gages, of which the following description, in connection with the accompanying drawings, is a specification, like letters on the drawings representing like parts.

This invention relates to water gages and the like and among other objects aims to provide a simple and effective device for securing the glass or other transparent means to the fluid containing part of the gage for disclosing the level of the liquid therein.

The character of the invention may be best understood by reference to the following description of an illustrative embodiment thereof shown in the accompanying drawing, wherein:

Figure 1 is a rear elevation of a gage illustrated herein as embodying the invention; Fig. 2 is a vertical section taken on line 2—2 of Fig. 1 showing parts in elevation; and Fig. 3 is a transverse section taken on line 3—3 of Fig. 1.

Referring to the drawings, the illustrative gage shown therein as embodying my invention comprises a fluid container, herein in the form of an elongated hollow block or tube 1 having hollow, rounded ends 3 interiorly threaded to receive the ends of pipes 5 for connection with the upper and lower ends of a boiler or other fluid container. To disclose the level of the water in the boiler the tube 1 may be provided with an elongated opening 7 over which may be placed a prism 9 of glass or other transparent material. The glass shown herein is what is known to the trade as a "Klinger" reflex glass, the characteristic feature of which consists in facets 11 (Fig. 3) on the inner side of said glass arranged in such a manner that the part of the glass which is covered by the liquid in the container will permit the passage of light while from the part of the glass covered by a gaseous body such, for example, as steam and air, the light will be reflected from said facets so that a sharp and clear line or demarcation is produced between the two bodies which will permit the level of the liquid in the gage to be plainly seen, even from a distance.

It is practically impossible to manufacture a thick, elongated prism or stick of glass, such as 9, which will be of uniform thickness throughout its length. Even if a glass of uniform thickness could be produced it is subject to distortion in use, owing to the fact that in use the steam containing end of the gage is heated much hotter than the water containing end thereof. It is, therefore, essential to provide a device which will secure the glass to the container with an evenly distributed pressure compensating for the differences in thickness of the glass referred to and any differences in thickness in the gaskets for the glass or dimension differences in other parts of the gage.

I will now describe a device whereby the glass may be secured to the container with an evenly distributed pressure to prevent any possibility of cracking or breaking of the glass and prevent any possibility of leakage between said glass and said container. To this end there is provided a frame or casing 13 formed to receive the tube 1 and glass 9, said frame having an elongated aperture 15 disclosing the glass and permitting the level of the water in the tube to be readily visible therethrough. To cushion the engagement of the glass 9 with the frame 13 and the container tube 1, gaskets 17 may be placed on opposite sides of said glass. To draw the glass and container together cam members or wedges 19 may be interposed between the back of the container 1 and the frame 13, the latter being provided with inner inclined surfaces 21 to conform to the taper of the wedges. It will be apparent that if these wedges are thrust apart they will act through the frame 13 and draw the glass to the container and cause them to be pressed together with a force proportional to the amount that the wedges are spread apart. The wedges 19 preferably are made of a resilient steel or other suitable resilient material and are arched or given a slight longitudinal curve as well shown in Fig. 2 so that when they are spread apart and thrust into the taper spaces between the back of the container and the inner inclined frame surfaces 21 they are flattened somewhat against their inherent resilience and as a result tend continuously to draw and maintain the glass tightly against the container. To spread said wedges 19 apart they may be provided with ears 23 projecting outward through elongated openings 25 in the frame said ears being threaded to receive oppositely threaded ends of a screw 27 which may have an intermediate portion slabbed off to provide suitable faces 29 for receiving a wrench for adjusting the screw. When the screw 27 is turned the wedges 19 will be spread apart and draw the glass tightly to said container. It will be observed that the screw 27 is not secured to the frame 13, but is free therefrom and merely connects one of the wedges with the other. The wedges 19 tapering away from one another and the screw 27 constitute a very advantageous construction since the wedges may be self-adjusting to conform to the proportions or dimensions of the parts clamped thereby.

As previously stated, it frequently occurs that the glass is not of uniform thickness throughout its length and the container 1 and frame 13 may be thicker at one end of the gage than at the other end thereof. I will now describe the clamping action of the wedges whereby they automatically compensate for these differences in thickness.

It may be supposed that the glass, gaskets, container tube and wedges have been assembled in the frame 13. To secure the glass to the container the glass and container preferably are temporarily secured together by any suitable clamping device. The gage is then subjected to heat and pressure such as it would receive in use. The glass, container and other parts therefore expand or assume the dimensions, relations and conditions that they would have in use. The screw 27 is then turned and the wedges commence to spread. If, for example, one end of the glass is thicker than the other end thereof the wedge at that end will be arrested before the wedge at the opposite end. The continued turning of the screw 27 will cause the wedge at the latter end to continue to move until it also is arrested. When the resistance to further movement of the wedges becomes equal the continued turning of the screw will cause them to be thrust tightly with equal force into the taper spaces between the frame faces 21 and the back of the tube. As a result of this automatic self-adjusting action of the wedges the glass and container are drawn together with a uniform pressure at the opposite ends thereof and cracking of the glass is prevented. After the wedges have been set as described the temporary clamping device may be removed and the glass is properly secured to the container in readiness for use.

Having described the means for effecting an equal clamping pressure of the opposite end portions of the glass, I will now describe a construction whereby the wedges may seat themselves automatically to effect a uniform pressure transversely to the length of the glass. To this end the back of the container may be constructed and arranged to have a fulcrum engagement with the wedges 19. As shown herein the back of the container 1 is formed to present a curved or rounded bearing back 31 permitting the container when pressed by the wedges to rock thereon and seat itself evenly against the inner face of the glass 9. The container and glass are therefore pressed together not only with a uniform pressure along the length of the glass but also with a uniform pressure transversely to the length thereof.

Heretofore considerable difficulty has been experienced with gages by the loosening of the clamped parts when they are highly heated in use. An important feature of the invention consists in the construction and arrangement of the wedges and adjusting screw whereby heat will not loosen, but on the contrary will tighten the parts. The screw is of considerable length and therefore when heated will have considerable expansion in the direction of its length. As a result when the parts are heated the screw will tend to spread the wedges and thereby effectually maintain them tightly seated between the frame and container and there will be no danger of the glass and container separating to permit leakage between them.

It will be observed that the devices for clamping the glass to the container do not enter the container tube, but are applied exteriorly of said tube, thereby reducing the possibility of leakage to a minimum. The adjusting screw is exterior of the frame and readily accessible for adjustment.

The parts of the gage are few in number, simple, strong in construction and readily assembled. It is not necessary to watch the gage to detect leakage and tighten adjustments, since this is done automatically. The greater the heat and pressure the gage is subjected to the more it will resist leakage.

Having described one embodiment of the invention without limiting myself thereto, what I claim as new and desire to secure by Letters Patent is:

1. A gage comprising, in combination, a container; a glass for disclosing the level of a liquid therein; and pressure wedge means for securing said glass and container together, and permitting said container to rock and seat itself evenly against said glass.

2. A gage comprising, in combination, a container; transparent means and means for securing said transparent means and container together including elongated clamping members extending longitudinally of said container, the latter being formed for fulcrum engagement with said members permitting said container to seat itself on said transparent means with an evenly distributed pressure.

3. A gage comprising, in combination, a container; transparent means for disclosing the level of a liquid therein; and means for securing said transparent means to said container including clamping members; and means to move said members relatively to one another, said container being formed for fulcrum engagement with said members.

4. A gage comprising, in combination, a container; a glass; and means to secure the same together including clamping members; and means to spread said members while permitting said container to seat itself against said glass with an evenly distributed pressure.

5. A gage comprising, in combination, a container; transparent means for disclosing the level of a liquid therein; a frame receiving said container and transparent means; and wedge means coöperating with said container and frame for securing said container and transparent means together, said container being formed for fulcrum engagement with said wedge means permitting said container to seat itself against said transparent means with an evenly distributed pressure.

6. A gage comprising, in combination, a fluid container; a glass for disclosing the level of a liquid therein; and means to secure said container and glass together comprising coöperating, adjusting means for automatically equally pressing said container and glass together longitudinally thereof; and adjusting means for automatically equally pressing said glass and container together transversely to the length thereof.

7. A gage comprising, in combination, a container 1; an elongated glass prism 9 for disclosing the level of a liquid in said container; a frame 13 receiving said glass and container; wedges 19 interposed between said container and frame; a screw 27 for moving said wedges apart to clamp said glass to said container, the latter having a fulcrum bearing portion 31 for engagement with said wedges permitting said container 1 to seat itself against said glass 9 with an evenly distributed pressure.

8. A gage comprising, in combination, a container; transparent means for disclosing the level of a liquid in said container; and means including resilient wedge means for yieldably securing said transparent means to said container.

9. A gage comprising, in combination, a container; transparent means for disclosing the level of a liquid in said container; a frame for said container and means; and means including resilient wedges coöperating with said frame and container for securing said means to said container.

10. A gage comprising, in combination, a container; transparent means therefor; and means for securing said transparent means to said container including resilient wedges tending to press said transparent means and container together and adjusting means for tensioning said wedges.

11. A gage comprising, in combination, a container; transparent means therefor; and means for securing said parts together including resilient wedge means formed to tend to press said container and transparent means together; and means to distort said wedge means from its normal shape and thereby tension said means.

12. A gage comprising, in combination, a container having an aperture therein; transparent means over said aperture for disclosing the level of a liquid in said container; and means for securing said transparent means to said container including clamping members, each opposite a different portion of said container along its length; and means operable by a single adjustment for actuating said members.

13. A gage comprising, in combination, a fluid container having an aperture therein; a covering glass over said aperture for disclosing the level of a liquid therein; a frame for said glass and container; and clamping wedge means coöperating with said frame and container for seating said glass over the aperture of said container to prevent leakage between them.

14. A gage comprising, in combination, a container having an aperture therein; transparent means over said aperture for disclosing the level of the liquid in said container; a frame for said transparent means and container and means coöperating with said frame and container for securing said transparent means over said aperture, said means including a plurality of members and means coöperating with the latter exterior of and separated from said frame and container.

15. A gage comprising, in combination, a container having an aperture therein; a glass over said aperture for disclosing the level of a liquid in said container; and means for securing said glass to said container including wedges and means connecting the latter for moving said wedges longitudinally.

16. A gage comprising, in combination, a container having an aperture therein; a glass covering said aperture for disclosing the level of a liquid in said container; a frame receiving said glass and container; wedges having portions at the exterior of said frame; and means to adjust said wedges relatively to one another to secure said glass over the aperture in said container to prevent leakage between them.

17. A water gage comprising, in combination, a container having an aperture therein; transparent means for said aperture; a frame encircling said container, and wedge means interposed between said frame and container for pressing said transparent means tightly toward said container to cover said aperture.

18. A water gage comprising, in combination, a container having an aperture therein; transparent means therefor; a frame receiving the latter; wedges coöperating with said frame and container and means for moving said wedges to press said transparent means tightly over said aperture.

19. A water gage comprising, in combination, a container having an aperture therein; transparent means therefor; a frame receiving the latter; wedges coöperating with said frame and container and screw means for moving said wedges to press said transparent means tightly over said aperture.

20. A gage comprising, in combination, a container; transparent means therefor; and means to secure said parts together including wedges and a screw having right and left threads for adjusting said wedges.

21. A water gage comprising, in combination, a container having an aperture therein; a glass therefor; a frame carrying the latter; wedges coöperating with said frame and container; ears on said wedges and a screw having ends oppositely threaded into said ears for setting said wedges to seat said glass to close said aperture.

22. A gage comprising, in combination, a container having an aperture therein; transparent means for said aperture for disclosing the level of a liquid in said container; and means for securing said transparent means over said aperture including wedge means and heat responsive expansible means coöperating with said wedge means and free from said transparent means and container.

23. A gage comprising, in combination, a container having an aperture therein; transparent means for said aperture for disclosing the level of a liquid in said container; wedges; a frame for said container, transparent means and wedges; and elongated heat responsive means free from said frame and expansible longitudinally for moving said wedges to secure said transparent means to said container.

24. A gage comprising, in combination, a container having an aperture therein; transparent means therefore for disclosing the level of a liquid in said container; and means for securing said container and transparent means together including wedges; and heat responsive, expansible means for sliding said wedges longitudinally of said container to secure said transparent means to said container.

25. A gage comprising, in combination, a container having an aperture therein; a covering glass for said aperture; a frame for receiving said glass; wedges interposed between said container and said frame; and means connecting said wedges for spreading the latter to secure said glass over said aperture.

26. A gage comprising, in combination, a container having an aperture therein; a covering glass for said aperture; and means for securing said glass over said aperture including wedges and a screw having right and left threads coöperating with said wedges for spreading the latter.

27. A gage comprising, in combination, a container having an aperture therein; a covering glass for said aperture; a frame for receiving said glass; wedge means coöperating with said frame and container; and a heat responsive screw threaded to said wedge means for automatically adjusting the latter to press said glass and container toward one another.

28. A gage comprising, in combination, a container having an aperture therein; a covering glass for said aperture; and means for securing said glass over said aperture including wedges tapering away from one another; and heat responsive expansible means connecting said wedges for causing the latter to move away from one another and draw said glass securely over said aperture.

29. A gage comprising, in combination, a container having an aperture therein; transparent means for said aperture; and means for securing said transparent means to said container including members operating on different portions of said transparent means and self-adjusting heat responsive means for actuating said members to equalize the pressure between said transparent means and container at said different portions.

30. A gage comprising, in combination, a container having an aperture therein; transparent means for said aperture; and means for securing said transparent means to said container including wedge means acting on opposite end portions of said container; and self-adjusting heat responsive means coöperating with said wedge means for equalizing the pressure on said end portions.

31. A gage comprising, in combination, a container having an aperture therein; transparent means over said aperture and automatic means for securing said transparent means over said aperture including wedges acting on different portions of said transparent means; and means connecting said wedges.

32. A gage comprising, in combination, a container having an aperture therein; transparent means for covering said aperture, and means for securing said transparent means over said aperture including wedges, and screw means connecting said wedges to permit the latter automatically to adjust themselves to the proportions of the parts secured together.

33. A gage comprising, in combination, a container having an aperture therein; a glass for covering said aperture, and means for securing said glass over said aperture with a uniform pressure, including wedges tapering away from one another, and adjusting means connecting said wedges independent of the rest of the gage.

34. A gage comprising, in combination, a container having an aperture therein; a glass covering said aperture and means for securing said glass over said aperture with a uniform pressure, including a frame, wedges interposed between said frame and said container and tapering away from one another, and adjusting means connecting said wedges independent of the rest of the gage.

35. A gage comprising, in combination, a container; transparent means therefor; and means for securing said parts together, including resilient, arched wedge means.

36. A gage comprising, in combination, a container; transparent means therefor; and means for yieldingly securing said transparent means to said container including resilient wedge means tending to assume an arched form and means to flatten and tension said wedge means.

37. A gage comprising, in combination, a container; transparent means therefor; and means for securing said container and transparent means together including pressure-applying wedges acting upon different portions of the container, and transmission means for transmitting pressure from one wedge to the other.

38. A gage comprising, in combination, a container; transparent means therefor; and means for securing said container and transparent means together including pressure-applying wedges acting upon different portions of the container, and transmission means automatically to equalize the pressures applied by said wedges.

39. A gage comprising, in combination, a container; transparent means therefor; and means for securing said container and transparent means together including pressure-applying members acting upon different portions of the container, means opposing said pressure-applying members acting upon the margin of the transparent means to leave the face thereof substantially unobstructed, and means automatically to equalize the pressures applied by the respective said members.

40. A gage comprising, in combination, a container having provision for connection with fluid-conducting means; transparent means for said container; and means for securing said container and transparent means together including pressure-applying members acting upon different portions of said container and transparent means and means automatically to equalize the pressures applied by the respective said members.

41. A gage comprising, in combination, a container having provision for connection with fluid-conducting means; transparent means for said container; and means for securing said container and transparent means together including pressure-applying members acting upon different portions of said transparent means, and combined adjusting and transmitting means for adjusting said members and automatically equalizing the pressures applied by them.

In testimony whereof, I have signed my name to this specification, in the presence of two subscribing witnesses.

GEORGE L. HUNTRESS, Jr.

Witnesses:
HENRY T. WILLIAMS,
ROBERT H. KAMMLER.